United States Patent [19]

Falz et al.

[11] Patent Number: 4,610,642

[45] Date of Patent: Sep. 9, 1986

[54] RING SEGMENT CONNECTION ARRANGEMENT FOR LINK COUPLING

[75] Inventors: Ulrich Falz; Manfred Lunke, both of Dortmund; Jürgen Walter, Haltern, all of Fed. Rep. of Germany

[73] Assignee: Hackforth GmbH & Co. KG, Herne, Fed. Rep. of Germany

[21] Appl. No.: 703,892

[22] Filed: Feb. 21, 1985

[30] Foreign Application Priority Data

Feb. 24, 1984 [DE] Fed. Rep. of Germany ....... 3406681

[51] Int. Cl.$^4$ ................................................ F16D 3/60
[52] U.S. Cl. ........................................ 464/69; 464/82
[58] Field of Search ............... 403/344; 464/51, 69, 464/81, 82, 137, 182, 185

[56] References Cited

U.S. PATENT DOCUMENTS

| | | | |
|---|---|---|---|
| 1,853,757 | 4/1932 | Behrens | 464/82 |
| 2,580,781 | 1/1952 | Hoffer | 464/69 |
| 3,726,108 | 4/1973 | Geislinger | 464/69 X |
| 4,377,386 | 3/1983 | Hannibal | 464/69 |

FOREIGN PATENT DOCUMENTS

| | | | |
|---|---|---|---|
| 970740 | 10/1958 | Fed. Rep. of Germany | 464/69 |
| 7612271 | 5/1977 | Fed. Rep. of Germany | . |

*Primary Examiner*—Stuart S. Levy
*Assistant Examiner*—Daniel P. Stodola
*Attorney, Agent, or Firm*—Becker & Becker, Inc.

[57] ABSTRACT

A link coupling having at least one coupling hub and one outer coupling flange interconnected by links or groups of links which are disposed at a tangent to the rotational axis. The links are arranged in pairs at an angle to one another, and are secured at their ends, by dowels or bolts, alternately to the hub and to the coupling flange. As an improvement, bolt-on ring segments are provided on at least one coupling part for the securing of the links. The bores for receiving the securing bolts or fasteners are enlarged, i.e. are formed with clearance. Unavoidable tolerances in bore diameters, and spacing errors, can therefore be compensated especially along with increase in reliability of operation.

7 Claims, 4 Drawing Figures

FIG-3
FIG-4
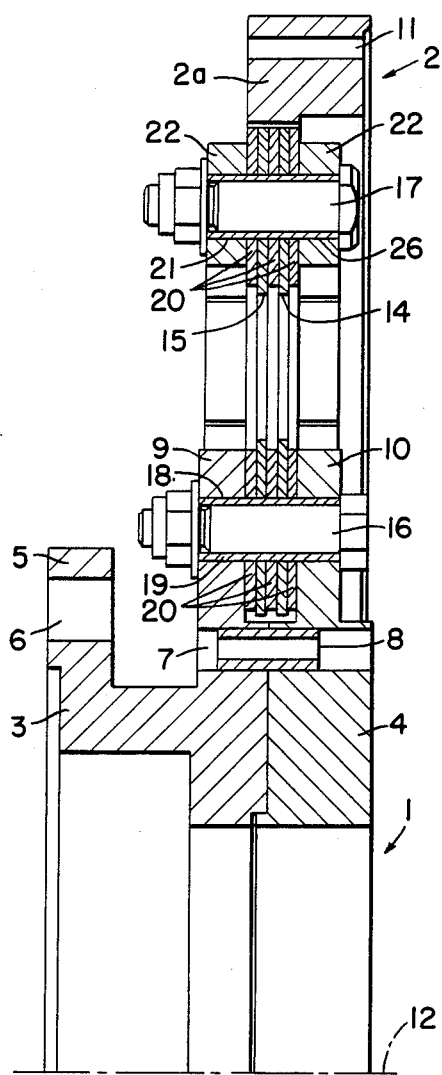
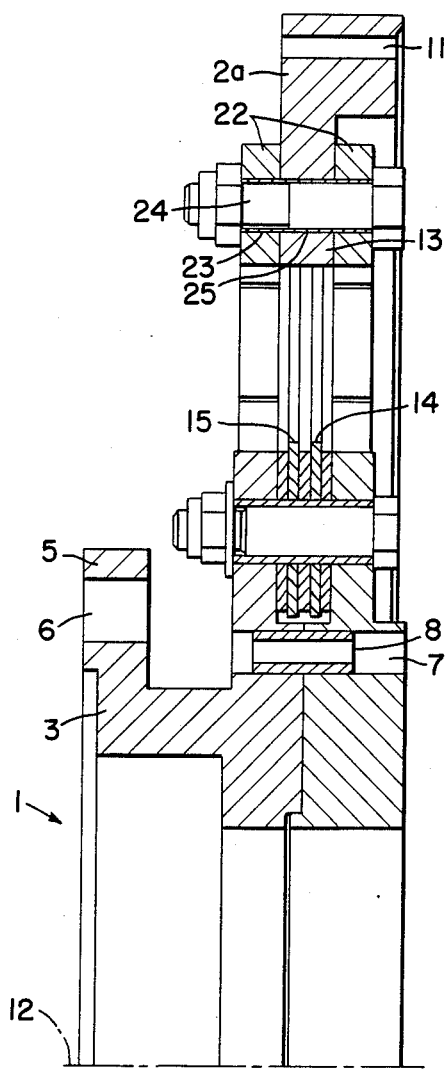

4,610,642

RING SEGMENT CONNECTION ARRANGEMENT FOR LINK COUPLING

BACKGROUND OF THE INVENTION

1. Field of the Invention

The present invention relates to a link coupling having at least one coupling hub and one outer coupling flange, the hub and flange being interconnected by means of links, or groups of links, which are disposed at a tangent to the rotational axis; the links are arranged in pairs at an angle to one another, and are secured at their ends, by dowels or bolts, alternately to the hub and to the flange in such a way as to be free of play in the direction of rotation.

2. Description of the Prior Art

Link couplings of this general type are known, for example from German utility model No. 76 12 271. In such a coupling, the links are torsionally rigid when transmitting peripherally directed forces, and bend readily axially; consequently, the coupling is resilient both axially and cardanically. The number of links used in a coupling depends to a large extent upon the torque which is to be transmitted, but also varies between individual designs, since any link can take the form either of an individual link or of a group of links.

Since the links experience relatively high tensions and compressions when transmitting forces, dowels or bolts must be used to secure the links to the rigid parts of the coupling. This kind of construction makes very stringent demands on manufacture if unavoidable spacing errors and diameter tolerances are to remain as low as possible. As has been found in practice, these requirements can be met only by means of special templates or specially designed jig boring machines. Manufacturing costs are therefore increased considerably. Even then, there are still assembly problems, for despite accurate manufacture, when parts produced by different manufacturing processes come together, the unavoidable tolerances may be adversely cumulative, thus complicating assembly considerably. This is especially true as regards the subsequent replacement of worn parts at the place of use.

An object of the present invention is to obviate the described disadvantages by altering the nature of the securing of the links, at least to one of the rigid coupling parts, with the aim of ensuring that the parts of such a coupling which are to be interconnectable can be produced by conventional mechanical engineering production methods (without templates and special boring machines), that the parts can be assembled readily, and that such a link coupling is as reliable in operation as a conventional link coupling.

BRIEF DESCRIPTION OF THE DRAWINGS

This object, and other objects and advantages of the present invention, will appear more clearly from the following specification in conjunction with the accompanying drawings, in which:

FIG. 3 is an axial cross-sectional view through the coupling as shown relative to an enlarged scale, and is taken along the line III—III of FIG. 1; and FIG. 4 is an axial cross-sectional view, also shown relative to an enlarged scale, and taken along the line IV—IV of FIG. 1.

SUMMARY OF THE INVENTION

Figure 1:
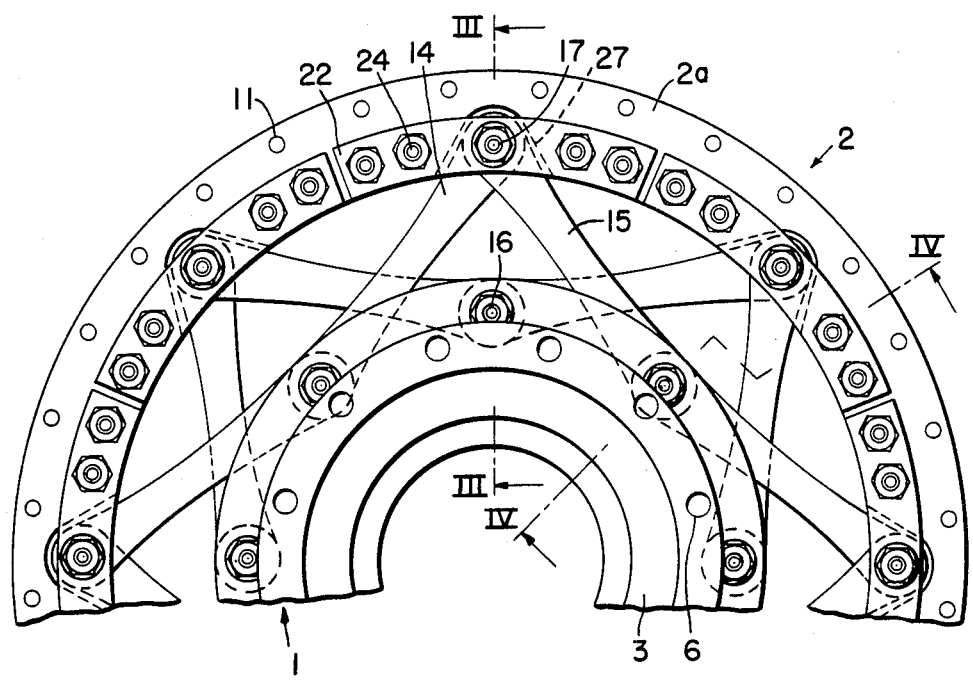
FIG. 1 is a partial end view of one embodiment of a link coupling according to the present invention.

The present invention starts from a link coupling of the aforementioned general type, and is characterized primarily in that the dowels or bolts are secured individually to separate ring segments, at least in the case of one coupling part; the segments are non-positively or frictionally secured to the respective coupling part by bolts or fasteners, with the bores for receiving the same being enlarged, i.e., having clearance, in the respective coupling part and/or in the ring segments.

The ring segments can be provided on either of the rigid coupling parts; advantageously, however, the ring segments are disposed on the larger coupling part; i.e., on the coupling flange.

Advantageously, a free-standing or independent ring flange, which extends towards the rotational axis of the coupling, is formed on the coupling flange; aligned pairs of ring segments, retained by common bolts or fasteners, are disposed against the axially opposite sides of this ring flange; and the ends of a given link pair are disposed between one pair of ring segments and are secured by means of a dowel or bolt which is secured in both of the ring segments.

Advantageously, for the periphery of the coupling flange to be very small for a given link length, the ring flange is provided near the dowels or bolts with recesses which start from the inner peripheral edge and which extend with clearance around the contours of the link ends which engage the bolt. Adequate space is thereby left for the link ends, so that the centers of the bores for the bolt and for the fasteners can be disposed on a common circular line.

To make good use of the available peripheral area, the ring segments are expediently disposed, with a small gap between their adjacent ends, on the entire periphery of the ring flange. Each ring segment, or each pair of ring segments, is adapted for the securing of a bolt disposed centrally on the ring segment, or pair of ring segments, as seen in the peripheral direction.

The present invention provides the substantial advantage for the manufacture of couplings of this kind that all of the bores of the coupling part not provided with the releasable ring segments can be manufactured by simple methods to the normal unavoidable diameter and spacing error tolerances. Similar considerations apply to the ring segment bores for receiving the bolts. The spacing errors and tolerances which are bound to arise are not inconvenient in the assembly of the various parts, since any deviations can be compensated for quite simply by the deliberate use of a clearance in the bores for receiving the fasteners used to secure the detachable ring segments.

DESCRIPTION OF PREFERRED EMBODIMENTS

Referring now to the drawings in detail, the illustrated coupling has rigid parts in the form of a hub 1 and an outer flange 2. The hub 1 is formed by two axially contiguous and clamped-together parts 3, 4. An annular flange or ring flange 5 is formed on the part 3, and is provided around the periphery thereof with spaced-apart bores 6 which are adapted to receive securing bolts. Bores 7, which extend axially and parallel to one another, and which register with one another, are distributed around the periphery of the hub parts 3 and 4 and receive composite locating or adapter sleeves 8, which serve to interconnect the parts 3 and 4 in such a way that the latter are fixed against rotation relative to one another. The periphery of the parts 3, 4 is formed by two flanges 9, 10, which are in alignment with one another, and are spaced apart axially from one another to leave a peripheral gap between them. The coupling flange 2 comprises an outer securing flange 2a formed with a number of bores 11 which extend axially and parallel to one another and which are adapted to receive securing bolts for connection to a further rotating element. A free-standing or independent ring flange 13, which is directed inwardly toward the rotational axis 12 of the coupling, is formed on the flange 2a; the axial thickness of the flange 13 conforms to the axial distance between the inside surfaces of the flanges 9 and 10.

The hub 1 and the flange 2 are interconnected by a total of sixteen links 14, 15, with two links at a time engaging a given dowel or fitted bolt 16 of the hub 1, and two links at a time engaging a given dowel or fitted bolt 17 of the flange 2. The hub flanges 9, 10 are provided with eight equidistantly spaced bores 18 which extend axially and parallel to one another, and which are adapted to receive the bolts 16. Each bore 18 receives a locating sleeve 19 for positive retention of the bolts 16. Each bolt has a head at one end, and at the other end has a thread for a securing nut.

Each of the links 14, 15 of the illustrated embodiment is in the form of a single link, for instance of spring steel, and has a contour as shown in FIG. 1. FIGS. 3 and 4 show spacers 20 interposed between the two links 14 and 15, and between a link and the corresponding inside surface of the flanges 9 and 10, to maintain a predetermined spacing.

At radially outward ends thereof, the links 14, 15 are similarly connected in pairs to a given bolt 17 and to a locating sleeve 21. However, in this case, the bolts 17 are not disposed in the flange 2 itself, but are each disposed in a respective pair of ring segments 22, all of which are identical to one another. Each segment 22 is provided at each of the ends thereof with two bores 23 which extend axially and parallel to one another, and which are adapted to receive bolts or fasteners 24 having a nut at their threaded end. The ring flange 13 is provided with an equal number of bores 25, which have a larger diameter than do the fasteners 24, i.e., are formed with a predetermined clearance, e.g. 1–2 mm. The bolts 17 and the sleeves 21 are positively retained in central bores 26 in the ring segments 22.

Figure 2:
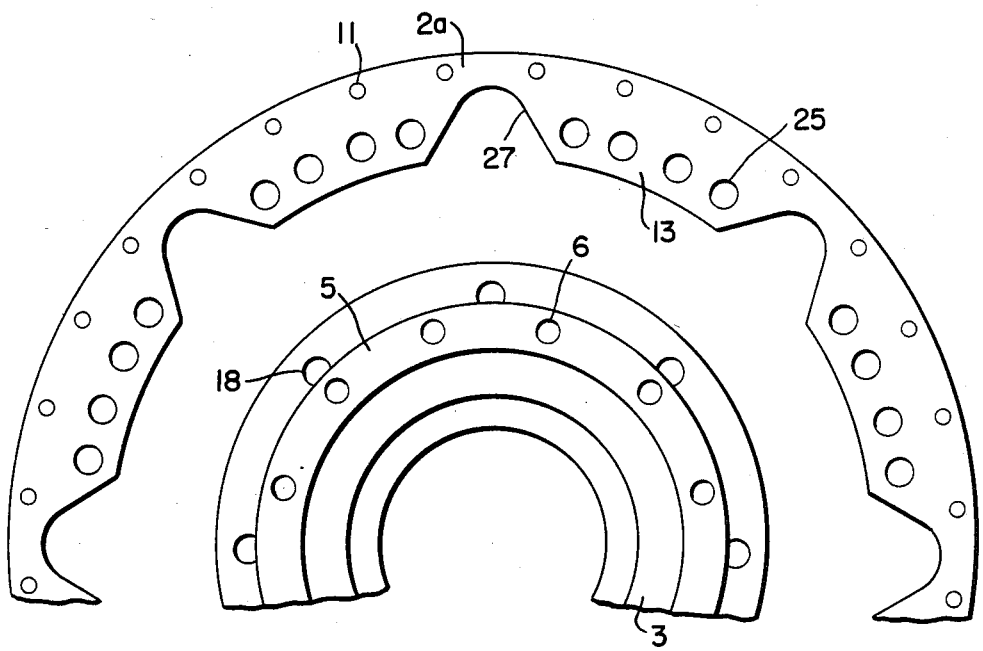
FIG. 2 is a partial end view of the outer coupling part before assembly.

According to FIGS. 1 and 2, the ring flange 13, near the outer ends of the links 14, 15, is provided with recesses 27 which start from the inner peripheral edge, and which conform approximately to the contours of the link ends, but with an appropriate gap of a size such that the likely relative movements between the flange 2 and the hub 1 cannot cause the links 14, 15 to contact the ring flange 13.

When such a coupling is assembled, all of the bolts 16, 17 are first properly fastened, and only then are the nuts of the bolts or fasteners 24 tightened to provide the non-positive or frictional connection between the links 14, 15 and the outer coupling flange 2.

The present invention is, of course, in no way restricted to the specific disclosure of the specification and drawings, but also encompasses any modifications within the scope of the appended claims.

What we claim is:

1. In a link coupling having an axis of rotation and having at least two coupling parts, namely at least one coupling hub and one outer coupling flange, with said coupling parts being interconnected stiff against torsion by links which are disposed in a location at a tangent to the axis of rotation of said coupling; said links having ends and being arranged in pairs at an angle to one another, with the ends thereof being alternately connected, by bolts, to said hub and to said outer coupling flange; the link end connection to at least one of said coupling parts comprising circumferentially spaced recesses receiving the respective link end pairs with a first clearance; ring segments connected to said link end pairs by said bolts and being detachably and frictionally connected to said at least one coupling part by fastening means; said ring segments being circumferentially spaced apart by a predetermined distance; said fastening means comprising fastening members and bores in each of said ring segments and said at least one coupling part for receiving said fastening members; the bores of at least one of said ring segments and at least one coupling part being larger than the cross-section of said fastening members so that said fastening members are held with play in the bores and are surrounded with clearance.

2. A link coupling in combination according to claim 1, in which said ring segments are connected to said outer coupling flange.

3. A link coupling in combination according to claim 2, in which a ring flange, which extends radially inwardly towards said axis of rotation of said coupling, is formed on said outer coupling flange; disposed on axially opposite sides of said ring flange are pairs of said ring segments, with said pairs being aligned with one another and being secured to said ring flange by common ones of said fastening means; the ends of a given pair of said links are disposed between a given pair of said ring segments, and are secured by a single one of said bolts, which is secured to both of said ring segments of that pair of ring segments.

4. A link coupling according to claim 3, in which said ring flange is freestanding and said recesses start from a radially inner periphery of said ring flange and proceed radially outwardly.

5. A link coupling in combination according to claim 4, in which respective centers of said bores for said bolts and said fastening means are disposed on a common circular line.

6. A link coupling in combination according to claim 3, in which said ring segments are disposed on an entire periphery of said ring flange, with a small gap being provided between adjacent ones of said ring segments.

7. A link coupling in combination according to claim 3, in which, when viewed in the peripheral direction, a given bolt respectively is centrally connected on its ring segment, with said bores of said ring segments for said fastening means being disposed on both sides of said given bolt respectively.

* * * * *